United States Patent [19]

Assaf

[11] Patent Number: 4,475,342
[45] Date of Patent: Oct. 9, 1984

[54] METHOD AND MEANS FOR LIFTING WATER AND GENERATING POWER THEREFROM

[75] Inventor: Gad Assaf, Rehovot, Israel

[73] Assignee: Lucien Y. Bronicki, Yavne, Israel; a part interest

[21] Appl. No.: 441,678

[22] Filed: Nov. 15, 1982

Related U.S. Application Data

[62] Division of Ser. No. 097,439, Nov. 26, 1979, Pat. No. 4,370,859.

[51] Int. Cl.³ .............................................. F03G 7/04
[52] U.S. Cl. ................................. 60/641.6; 60/641.1; 60/398; 60/641.12
[58] Field of Search ................. 60/641.1, 641.6, 641.7, 60/641.8, 641.11, 641.12, 398, 325, 674; 417/65

[56] References Cited

U.S. PATENT DOCUMENTS

| | | | |
|---|---|---|---|
| 2,265,875 | 12/1941 | Stoker | 417/65 X |
| 3,894,393 | 7/1975 | Carlson | 60/641 |
| 4,106,295 | 8/1978 | Wood | 60/674 |
| 4,370,859 | 2/1983 | Assaf | 60/641.6 |

Primary Examiner—Allen M. Ostrager
Attorney, Agent, or Firm—Sandler & Greenblum

[57] ABSTRACT

Water is raised from a lower to a higher level by creating an air/water-droplet environment which is effective to establish a pressure head that imparts an upward velocity to the air in excess of the downward drift velocity of the droplets whereby the latter are carried upwardly by the air. Such an environment is created by introducing droplets of relatively warm water into relatively cool air at the lower end of a vertically oriented lift tower thereby heating the air which rises in the lift tower with a velocity sufficient to carry the droplets to the upper end of the lift tower. By directing the flow at the upper end of the lift tower toward the horizontal, the upwardly directed velocity component of the droplets is lost and they follow a ballistic path into a reservoir from which water is returned to the lower level through a hydraulic turbine.

8 Claims, 5 Drawing Figures

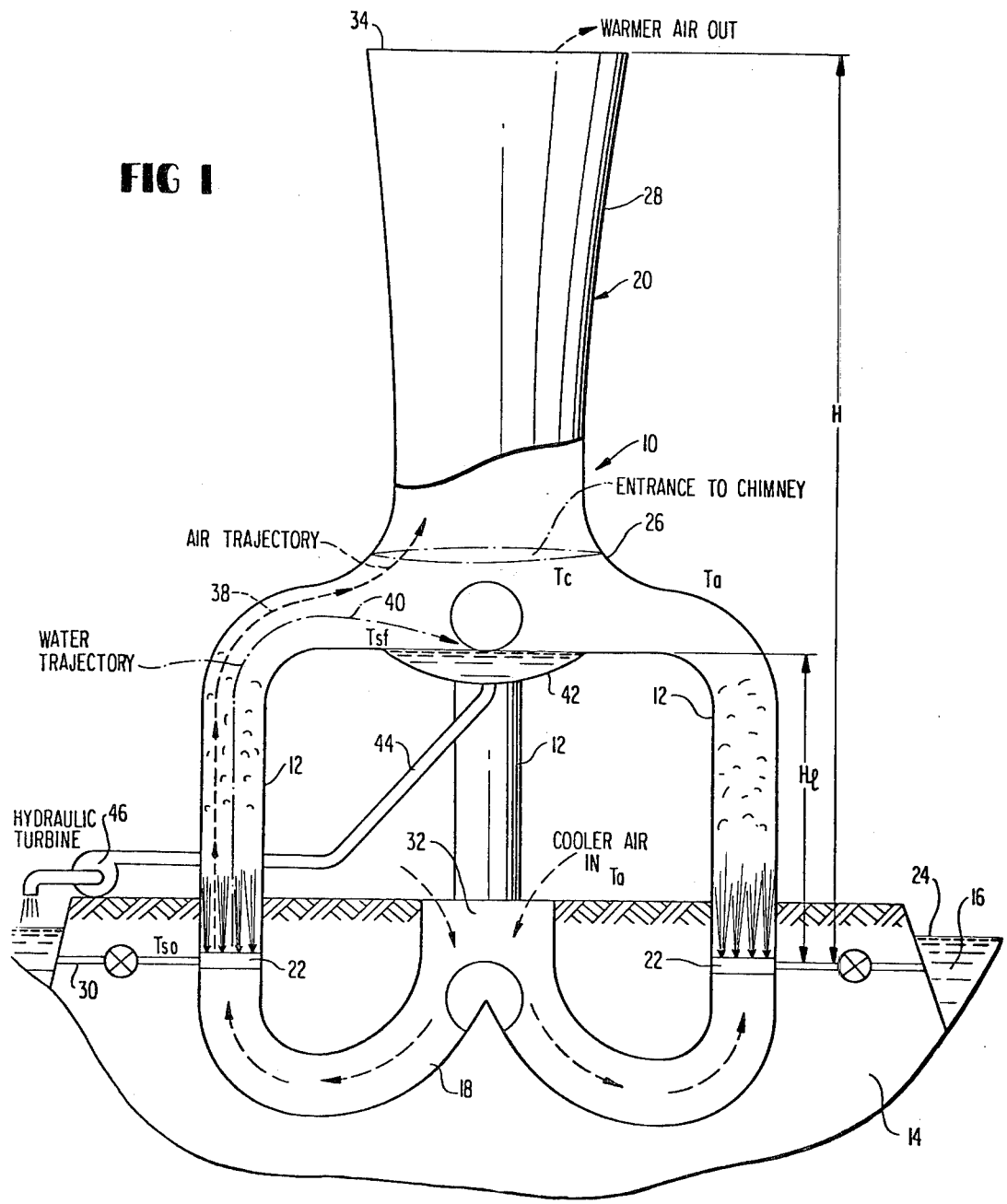
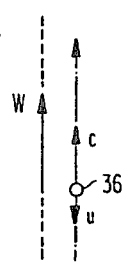
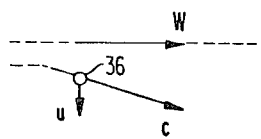

METHOD AND MEANS FOR LIFTING WATER AND GENERATING POWER THEREFROM

This is a division of application Ser. No. 97,439 filed Nov. 26, 1979, now U.S. Pat. No. 4,370,859.

BACKGROUND OF THE INVENTION

This invention relates to a method of and means for producing power utilizing the flow of air in a high chimney as established by a pressure head across the chimney.

One way to establish the required pressure head is to heat the air in the lower portion of the chimney thereby decreasing its density and causing it to rise to the top of the chimney, the air flow being passed through a turbine to convert the kinetic energy of the air to useful work. Conventionally, solar energy or waste heat is utilized for heating the air. This approach is well known but has not formed the basis of a practical power generating system because the efficiency of the resultant system is relatively low requiring large amounts of heat to obtain small amounts of work.

Another way to establish the required pressure head is to cool the air in the chimney increasing its density and causing it to fall through an air turbine at the base of the chimney. This technique is illustrated in U.S. Pat. No. 3,894,393 which discloses spraying water into a chimney near the top thereof thereby evaporating the water and affording a particularly simple way of cooling the air. While the above-identified patent indicates a rather startling efficiency and power output can be obtained, the fact is that the analysis in the patent fails to take into account the drag loss of the duct on the air flow, and fails to relate the maximum exit velocity to the pressure head. A more complete analysis of the device shown in the patent reveals that the drag loss will be far in excess of the useful power that can be generated and the exit velocity of the air will be an order of magnitude less than that computed in the patent. Consequently, this technique has not found practical application in generating power.

Despite the long-term existence of the techniques described above, and despite the present need for non-fossil fuel power generation, the above-described practical difficulties with these techniques have prevented their utilization even on a small scale. It is therefore an object of the present invention to provide a new and improved system utilizing a high chimney of the type described above which overcomes or substantially reduces the difficulties and disadvantages of the prior art.

SUMMARY OF THE INVENTION

According to the present invention, water is raised in a lift tower from a lower to a higher level by creating, in the tower, an air/water-droplet environment which is effective to establish a pressure head across the tower the head being sufficient to impart an upward velocity to the air in excess of the downward drift velocity of the droplets. As a consequence, drag forces acting on the droplets conteract the negative bouyancy (due to gravity) of the droplets which are carried upwardly by the rising air. By redirecting the flow at the upper end of the lift tower, the droplets lose their upward velocity component and are collected in a reservoir. Specifically, the necessary environment is created by introducing droplets of warm water into cooler air at the lower end of the lift tower thereby heating the air which rises and carries the droplets to the upper end of the tower.

The water introduced into the lift tower can be derived from a source at a relatively constant temperature above the ambient air temperature; and the cooled water in the reservoir can be returned to the source. In one form of the invention, the level of the reservoir is above the level of the source and the water in the reservoir is returned to the source through a hydraulic turbine which converts the pressure head represented by the water in the reservoir into work. In such a case, the level at which the water is introduced into the lift tower can be below the level of the water in the source so that a pressure head is utilized for spraying the water into the lift tower. This has the advantage of eliminating the need for pumping the water into the lift tower.

In another form of the invention, the lift tower is constructed below the level of the source such that the top of the reservoir is just above the level of the source to enable the water in the reservoir to flow into the source. In such a case, water from the source passes through a hydraulic turbine before being sprayed into the lift tower.

The present invention is ideally suited for generating power utilizing deep water in lakes, fjords, and seas as a heat source in environments where the air temperature is below freezing. Alternatively, the present invention is applicable to condenser cooling towers in nuclear power plants where large quantities of low grade heat must be dissipated. The conventional approach is to spray the condenser cooling water into a large cooling tower and reuse the cooled water in the condenser. Using the present invention, hot water from the condenser can be sprayed into the bottom of a lift tower producing an upflow of air that carries the spray to the upper level of the tower. The cooled water can be recovered for reuse after passing it through a hydraulic turbine. This approach converts the low grade heat in condenser cooling water to useful energy instead of dissipating the heat to the environment.

BRIEF DESCRIPTION OF THE DRAWINGS

Embodiments of the present invention are disclosed in the accompanying drawings wherein:

FIG. 1 is an elevation view, schematic in nature and partially in cross-section, showing one form of the present invention;

FIG. 2A shows a water-droplet being carried upwardly by reason of the upward velocity of the air in the lift tower shown in FIG. 1;

FIG. 2B shows a droplet being separated from the air stream when the air velocity is horizontally oriented;

DESCRIPTION OF THE PREFERRED EMBODIMENTS

Figure 3:
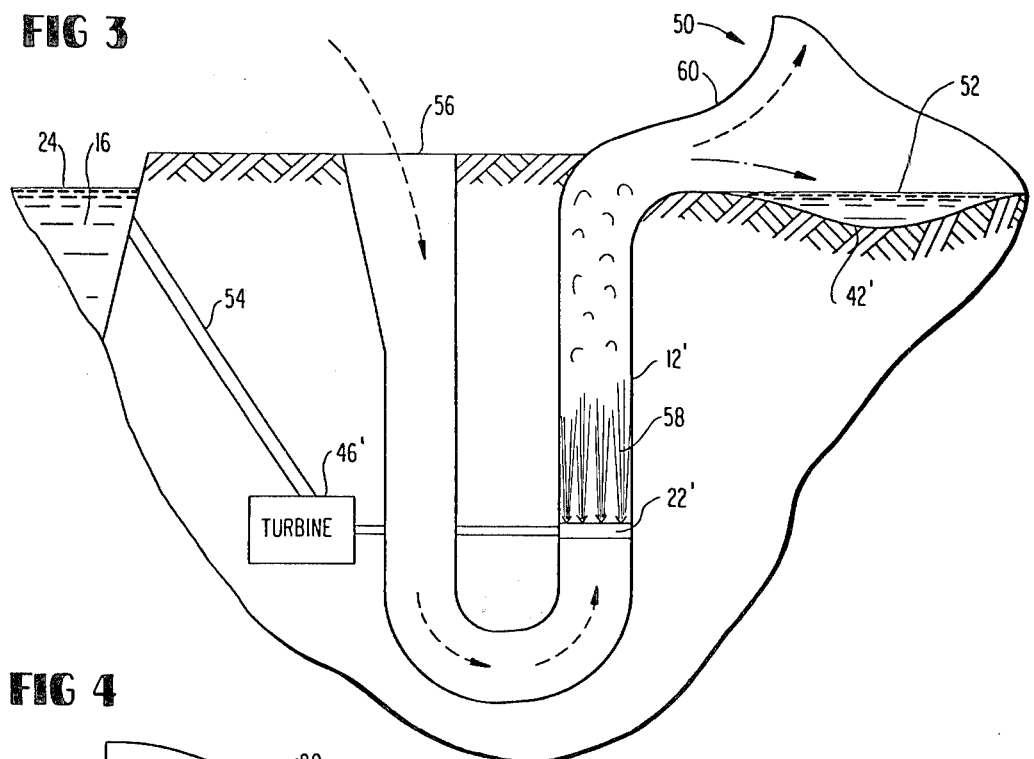
FIG. 3 is a second embodiment of the present invention.

Referring now to FIG. 1, reference numeral 10 designates a first embodiment of the present invention which structurally comprises a plurality hollow of vertical tubes 12 extending below the grade of earthen portion 14 adjacent a body of water 16, underground conduits 18 connected to the tubes 12, and superstructure 20 connected to the top of the tubes. Conduits 18 form an inlet 32 from the grade level of earthen support 14 to the bottom of each of the tubes 12 where a spray device 22 is located below the level 24 of the body of water. The upper ends of tubes 12 are interconnected by a connector structure 26 forming the base of chimney 28.

Spray heads 22 are furnished with water from the body of water via pipelines 30, there being a sufficient hydraulic head produced by reason of the level of the water in the body of water and the depth of the pipe 30 to effect the vertical spraying of water from the body of water into the vertical tubes. Each vertical tube constitutes a lift tower wherein cool ambient air enters at the bottom, as indicated in FIG. 1, and exits into connector structure 26 from which the air exits through the top of chimney 28. As explained in the detailed analysis that follows, the warming of air in lift tower 12 reduces its density and establishes a pressure head across the tube, such pressure head causing an upward flow of air from inlet 32 at the grade level to the outlet 34 of the chimney. By suitable selection of the parameters of the lift tower and the chimney, the air in the lift tower achieves a vertical velocity W as shown in FIGS. 2A and 2B. This vertical velocity exceeds the so-called drift velocity u of the water-droplets in the lift tower, one of which is indicated by reference numeral 36 in FIGS. 2A and 2B, causing the water-droplets to have a net upward velocity of c. For reference purposes, the drift velocity of water-droplet varies according to the half-power of its radius. For a 1 mm diameter droplet, the drift velocity is about 5 m/sec.

Spraying warm water into the cooler air in the tower creates an air/water-droplet environment in which the droplets ascend from the lower level of the lift tower to the upper level thereof as indicated by the water-droplet trajectory 40. The elbow-shaped portions of the connector structure at the top of the lift tower serve to redirect the air from a vertical path towards a horizontal path before the air reaches the inlet to chimney 28. As indicated in FIG. 2B, redirecting the air into a substantially horizontal direction causes the drift velocity of the water-droplets to become effective to direct the droplets downwardly while the air continues horizontally as indicated by air trajectory 38. Thus, a ballistic trajectory indicated at 40 in FIG. 1 is achieved by the water-droplets which fall into the central region between the lift towers and are collected in reservoir 42 which is structurally supported by the plurality of lift towers 12. Because the air in the chimney is heated and is less dense than the air outside the chimney, the upward draft continues and the air exits from the top of the chimney.

Instead of sharply redirecting the air as shown in FIG. 1 by connector structure 26, an inclined diffuser arrangement could be provided in place of tubes 12 in order to collect the droplets. In such case, the upward air velocity would eventually be reduced below the value necessary to create drag forces on the droplets with a vertical component smaller than the drift velocity of the droplets. This arrangement will allow the water droplets to be collected at an upper level relative to the level at which the droplets are introduced into the airstream.

Water collected in reservoir 42 is returned to source 16 through conduit 44 after passing through hydraulic turbine 46. Thus, some of the heat contained within the source 16 has been converted into mechanical work by way of the lift towers.

Instead of locating the spray heads 22 below the surface 24 of the body of water 16, it is possible to locate the spray heads above the surface of the water and to utilize some of the work produced by the hydraulic turbine for driving a pump which will pump water from the source into the spray heads.

Referring now to FIG. 3, reference numeral 50 designates the second embodiment of the present invention wherein the lift tower 12' are located below the grade level of earthen portion 14 such that the level 52 of reservoir 42' of embodiment 50 is substantially equal to or slightly above the level 24 of body of water 16. This way, water in reservoir 42' can flow into the body of water 16.

As shown in FIG. 3, spray head 22' is supplied with water that exhausts from hydraulic turbine 46' located at a level below the surface 24 of the body of water and connected thereto by conduit 54. If operation, relatively cooler air enters through the air inlet section 56, and flows downwardly into the lower end of the inlet to lift tower 12' where it is warmed by spray 58 produced by spray heads 22'. The warmed air containing the droplets rises as in the case of embodiment 10, and the connector section 60 connected to the top of the lift tower redirects the air-water-droplet mixture and causes separation of the water from the air as previously described.

Figure 4:
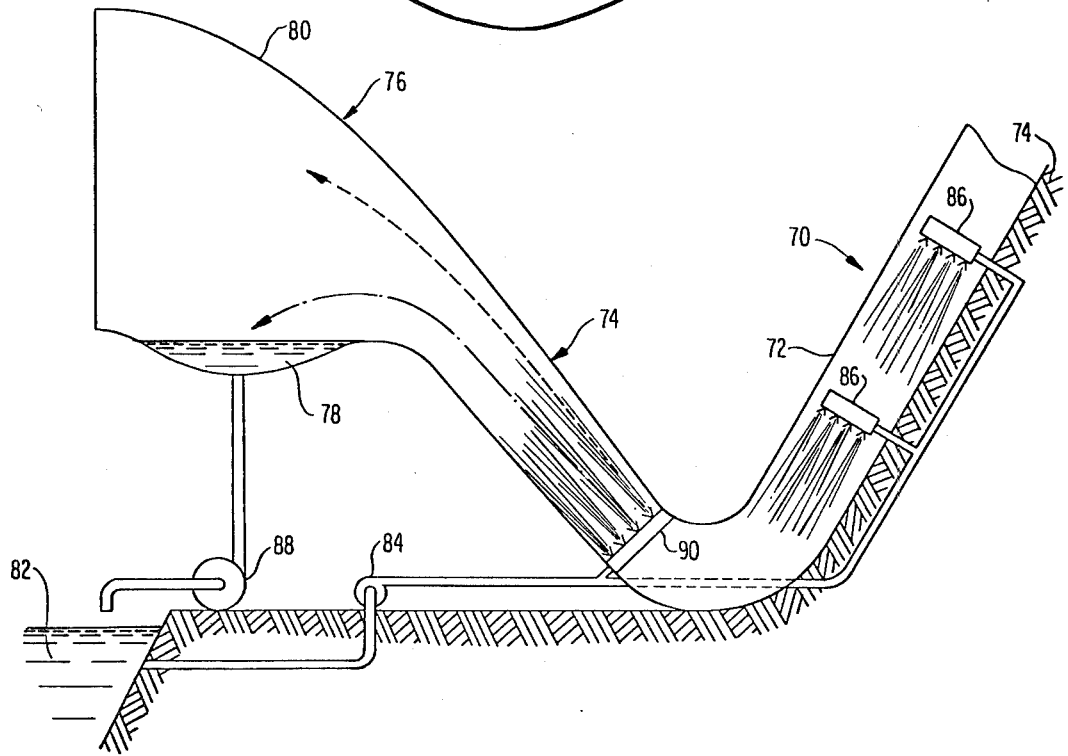
FIG. 4 is a third embodiment of the invention shown in combination with the airfall of U.S. Pat. No. 3,894,393.

Referring now to FIG. 4, reference numeral 70 designates a third embodiment of the invention combined with the airfall in U.S. Pat. No. 3,894,393. Specifically, embodiment 70 includes a large sloping duct 72 built into the side of mountain 74 in accordance with the disclosure in the above-mentioned patent. At the bottom of the duct is an upwardly extending lift tower 74; and at the upper end of the lift tower is a superstructure 76 which includes reservoir 78 and diffuser section 80. Water from source 82 is pumped via pump 84 into spray heads 86 in the duct 72 as disclosed in the above-identified patent. As described therein, an airfall is created when the water sprayed into the duct evaporates; and the cooled air, at a relatively high velocity, is directed into the inlet of the lift tower 74. At such inlet is spray head 90 which sprays water into the moving mass of air. The rapidly moving air created by the airfall, carries the spray upwardly diffuser section 80 which is effective to reduce the velocity of the air and permit the water to collect in reservoir 78 where it flows back to the source through hydraulic turbine means 88. In this embodiment, heat contained in the source 82 is not converted into potential energy as in the other embodiments.

By utilizing the principles of thermodynamics and fluid mechanics, it can be shown that the heat flux q from the spray at the bottom of the lift tower into the air therein can be expressed as follows:

$$q = m_s f(r)[T_s - T_1] \tag{1}$$

where $m_s$ is the spray mixing ratio (Kg water to Kg air), f(r) is a function of the radius of the droplets and is defined in detail below, $T_1$ is the spray temperature and $t_s$ is the air temperature.

From the dynamics of the fluid in the lift tower, it can be shown that the time derivative of the temperature difference, DelT, between the spray and the air is as follow:

$$\text{Del}\dot{T} = -m_s f(r)\text{Del}T(1/C_a + 1/C^*) \tag{2}$$

where DelT is the temperature difference between the spray and the air, $C_a$ is the specific heat of air and $C^*$ is a function of the specific heat of the spray and the relative amounts of ice and vapor in the lift tower as defined in detail below. Integration of equation (2) and its combination with equation (1) yields the following three equations that define the conditions within the lift tower and the chimney:

$$T_{sf} - T_c = (T_{so} - T_a) \exp - \{f(r)[H(T_c - T_a)/2 - gT_a]^{\frac{1}{2}}(1/C^{**})\} \quad (3)$$

$$m_s H_1 = H(T_c - T_a)/T_a \quad (4)$$

$$m_s C^*(T_{so} - T_{sf}) = C_a(T_c - T_a)(U/U - U_d) \quad (5)$$

where $T_{sf}$ = temperature of spray (final state)
$T_{so}$ = temperature of spray (initial state)
$T_a$ = is the temperature of air at the inlet of the chimney
$T_c$ = is the temperature of air at the inlet of the chimney
H = is the height of the chimney including the lift (see FIG. 1)
$H_1$ = is the height of the lift tower
$DiT = T_c - T_a$
g = the gravitational constant
$K_a$ = the heat conductivity of air
$\rho_w$ = the density of water at the inlet temperature conditions
$U = [g(DiT/T_a)H]^{\frac{1}{2}}$
$U_d$ = drift velocity
$\rho_a$ = the density of air at the inlet conditions
r = radius of the spray drops
$C_d$ = the drag coeffecient of the droplets
$N_i$ = the kinematic viscosity of air
$C_a$ = specific heat of air $$f(r) = (3K_a/\rho_w[1/r^2 + 0.57(2g\rho_w/3C_d\rho a)^{\frac{1}{2}}/(r^5 N_i^2)^{\frac{1}{4}}]$$

$$C^* = C_s + X_f L_f/(T_{so} - T_{sf}) - X_v L_v/(T_{so} - T_{sf})$$

$$C^{**} = 1/(1/C_a + 1/C^*)$$

$X_f$ = fraction of ice to spray
$X_v$ = fraction of spray evaporated in lift
$L_f$ = latent heat of transformation of water to ice
$L_v$ = latent heat of transformation of vapor to liquid It can also be shown that the ideal output of the chimney is given by:

$$P = \frac{1}{2}\rho_a[2g(T_c - T_a)H/T_a]^{1.5} KW/m^2 \quad (6)$$

where the output is in terms of the unit area of the chimney cross-section. The actual output of the chimney can approach about 75% of the ideal if the function loss in the chimney is kept below 5%. This will be the case as long as the ratio of chimney length to diameter is less than about 10.

Certain variables in equations (3), (4) and (5) are given as a consequence of geographic considerations ($T_{so}$, $T_a$), construction restraints (H) and assumed operating conditions ($X_v$, $X_f$, $U_d$). When $T_c$ is chosen, the variable U (upward air speed) is known. Thus, there are three equations with four unknowns ($m_s$, $H_1$, $T_c$ and $T_{sf}$). Selection of three of these unknowns will permit the fourth to be calculated.

The expected performance of a lift tower under selected conditions is tabulated below:

| d mm | $m_s$ | $T_{so}$ °C. | $T_{sf}$ °C. | $T_c$ °C. | $T_a$ °C. | H m | $H_1$ m | $U(T_c)$ m/sec | $U_d$ m/sec | P KW/m² | $X_f$ |
|---|---|---|---|---|---|---|---|---|---|---|---|
| 2 | 0.6 | 4 | 0 | −6 | −10 | 1000 | 27 | 7 | 17 | 2 | |
| 1 | 1.0 | 4 | 0 | −0.5 | −10 | 1000 | 32 | 5 | 26 | 10 | |
| 1 | 2 | 1 | 0 | −0 | −30 | 1000 | 61 | 5 | 47 | 60 | 0.05 |
| 1 | 2 | 1 | 0 | −0 | −30 | 500 | 31 | 5 | 33 | 20 | 0.05 |

What the above tabulation clearly indicates is the importance of the droplet size (d) and the spray mixing ratio ($m_s$) on the output. In addition, it is evident that the air temperature ($T_a$), and the temperature of the input spray water ($T_{so}$) are important considerations in maximizing the output.

Ideal locations for constructing a lift tower according to the present invention would be in the northern region of Alaska, for example, where water at 0° C. is available the year round and from November to March the air temperature ranges from −15° C. to −30° C., providing the tower with a 15 to 30 degree temperature differential between the input spray water and the air. Another ideal location would be adjacent Lake Superior where the water in the period December to March 2-3 C. and the air temperature averages −7° C. to −12° C., providing a 10 to 15 degree temperature differential.

With regard to the equations listed above, it has been assumed that the temperature difference across the chimney ($T_c - T_a$) is a constant and is independent of altitude throughout the length of the chimney. Actually, this is a relatively good approximation of the actual situation, because the air temperature T decreases with altitude at about the same way that the air temperature within the chimney decreases during its displacement along the length of the chimney.

Finally, a modified version of the present invention is also contemplated. In this case, the addition of warmer water to cooler air will produce an updraft in a chimney within which air turbines are positioned to extract energy from the upwardly moving air. Of course, the turbines could be located below the water spray if desired.

The ideal output of a lift tower under the condition of water at about 1° C., air at about −30° C., a droplet size of about 1 mm diameter, a chimney height of about 500 meters with a diameter of about 50 meters is about 36 megawatts. While the initial costs per kilowatt output would be comparable to a nuclear power station, the device of the present invention has no fuel costs.

In such case, the water could be sprayed downwardly in a horizontal run connected to the lower end of the chimney. Being warmer than the air, the water would be cooled as the air is heated; and the cooled water collected at the bottom of the chimney would be discharged. The warmed air in the chimney, being lighter than the air outside the chimney, will rise in the chimney. The resultant flow of air will drive an air turbine located either at the inlet to the chimney or at its outlet.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. In a power generating system that includes an elongated duct having a higher and a lower end, sprayers for spraying water into the duct for increasing the density of the air therein thereby inducing a downward flow of air in the duct, the improvement comprising providing a lift tower at the outlet of the elongated duct for upwardly redirecting the air exiting from the bottom of the elongated duct, spraying water-droplets into the lower end of the lift tower, the droplets being of such size that drag forces on the droplets cause them to rise to an upper level of the tower, separating the droplets from the air at said upper level by reducing the upward component of the air velocity, collecting the droplets in a reservoir, and returning water in the reservoir to the lower end of the tower through hydraulic turbine means.

2. The improvement of claim 1 wherein power for spraying the water is derived from the output of the hydraulic turbine means.

3. A method of lifting water for generating power comprising the steps of:
   (a) creating an airfall (i.e., a downwardly directed air flow) in a downwardly directed conduit by spraying water into the conduit thereby cooling the air and increasing its density;
   (b) redirecting the downwardly flowing air mass into an upwardly flowing air mass; and
   (c) collecting droplets of water raised by the upwardly flowing air mass at an upper level.

4. A method of lifting water according to claim 3 including the step of spraying droplets of water into the upwardly flowing air mass whereby drag forces act on the droplets raising them from a lower to an upper level.

5. A method of lifting water according to claim 4 including the step of returning the collected droplets to the lower level through hydraulic turbine means.

6. A power plant comprising:
   (a) a downwardly directed conduit whose lower level is connected to the lower level of an upwardly directed conduit;
   (b) a reservoir of water at a lower level; and
   (c) means to spray droplets of water from the reservoir into the two conduits for causing air in the downwardly directed conduit to flow downwardly into the upwardly directed conduit, and for causing the upwardly flowing air mass in the upwardly directed conduit to create drag forces on the droplets therein which raise the droplets to the upper level of the upwardly directed conduit above the reservoir.

7. A power plan according to claim 6 including means for correcting droplets at said upper level, and hydraulic turbine means for receiving collected droplets and returning them to the reservoir.

8. A power plan according to claim 7 wherein the power to spray the water is derived from the output of the hydraulic turbine means.

* * * * *

UNITED STATES PATENT AND TRADEMARK OFFICE
CERTIFICATE OF CORRECTION

PATENT NO. : 4,475,342

DATED : October 9, 1984

INVENTOR(S) : Gad ASSAF

It is certified that error appears in the above-identified patent and that said Letters Patent is hereby corrected as shown below:

Column 6, line 31, after "March", insert ---is---.

Column 1, line 62, change "conteract" to ---counteract---.

Column 2, line 63, change "hollow of" to ---of hollow---.

Column 4, line 16, change "If" to ---In---.

Column 8, line 27, change "correcting" to ---collecting---.

Signed and Sealed this

Second Day of July 1985

[SEAL]

*Attest:*

DONALD J. QUIGG

*Attesting Officer*  *Acting Commissioner of Patents and Trademarks*